United States Patent Office 3,542,589
Patented Nov. 24, 1970

3,542,589

MAGNETIC RECORDING MEDIA HAVING HIGH ABRASION RESISTANCE

Job-Werner Hartmann and Georg Schnell, Ludwigshafen (Rhine), Erwin Schmidt, Frankenthal, Pfalz, and Friedrich Gress, Ludwigshafen (Rhine), Germany, assignors to Badische Anilin- & Soda-Fabrik Aktiengesellschaft, Ludwigshafen (Rhine), Germany

No Drawing. Filed Mar. 27, 1968, Ser. No. 716,342
Claims priority, application Germany, Apr. 3, 1967, 1,278,514
Int. Cl. H01f *10/02*
U.S. Cl. 117—235 2 Claims

ABSTRACT OF THE DISCLOSURE

The magnetizable layer of a magnetic recording medium consisting essentially of the magnetizable pigment and a binder and which has been applied to non-magnetic backing, contains an acetal as a lubricant or slip additive to increase its abrasion resistance.

The present invention relates to a magnetic recording medium having outstanding abrasion resistance.

It is of decisive importance for the life and consequently for the usefulness of a magnetic recording medium that the magnetizable layer with which the magnetic head is in contact should have high abrasion resistance. This is particularly important in the case of magnetic recording media for video recordings because these media are subjected to particularly high mechanical stresses owing to the high relative speed between the magnetic head and the magnetizable layer.

It is known that lubricants may be added to the magnetizable layer to diminish or eliminate abrasion. Graphite, molybdenum disulfide, silicones, waxes or other esters of fatty acids with alcohols have already been used as lubricants. The said substances have not however given satisfactory results hitherto. For example when graphite is added, the sensitivity of the magnetic recording medium is decreased, while silicones are often not compatible with the other constituents of the magnetizable layer and exude so that the gaps in the magnetic heads become soiled in the course of time when using media containing silicones. Fatty acid esters on the other hand unduly increase the surface resistivity of the layer.

We have now found that the said disadvantages in magnetic recording media consisting of non-magnetic backing and a magnetizable layer of magnetizable pigment, binder and slip additive applied thereto are overcome when the magnetizable layer contains as the slip additive, for each 100 parts by weight of magnetizable pigment, 1.5 to 16 parts by weight of an acetal having the general formula:

$$R_1-\underset{\displaystyle OR_3}{\overset{\displaystyle OR_2}{\overset{|}{\underset{|}{C}}}}-H$$

in which $R^1$ denotes a hydrogen atom or an alkyl radical having four to twelve carbon atoms and $R^2$ and $R^3$ denote identical or different alkyl radicals having four to twelve carbon atoms, the total number of carbon atoms contained in the acetal not exceeding 26 per molecule.

The alkyl radicals contained in the acetals may be branched or linear.

Examples of particularly suitable slip additives are di-2-ethylhexylisobutyl acetal and di - n - butyl-2-ethylhexyl acetal.

The said compounds may be used individually as slip additives, but obviously it is also possible to use mixtures of these compounds.

The amount of slip additive to be added to the magnetizable layer may be varied within wide limits. To achieve a significant effect it is advantageous to add at least about 1.5 parts by weight of slip additive to each 100 parts by weight of magnetizable pigment. An amount of 16 parts by weight of slip additive to 100 parts by weight of magnetizable pigment should not be exceeded in order that the mechanical properties of the magnetizable layer should not be impaired.

It is preferred to add acetals as slip additives in an amount of from 2.5 to 8 parts by weight for each 100 parts by weight of magnetizable pigment.

Pigments conventionally used, for example gamma-$Fe_2O_3$ or metallic particles, for example of cobalt or nickel, may be used as magnetizable pigments.

Binders commonly used for the production of magnetic recording media, for example polymers of vinyl chloride, vinyl acetate, acrylic esters and their copolymers, polyurethanes and polyamides, may be used as binders.

In the production of the magnetic recording media the slip additive is advantageously mixed with the magnetizable pigment and the resultant mixture worked up with a solution of the binder to form a dispersion. This dispersion is then applied to the non-magnetizable backing, for example to a suitable plastics film, and solidified thereon.

The magnetizable layer thus produced has, in addition to the required magnetic and electroacoustic properties, high abrasion resistance and consequently a long life. For these reasons it is particularly suitable for video tape.

The invention is further illustrated by the following examples in which the parts specified are parts by weight.

EXAMPLE 1

100 parts of acicular gamma-iron(III) oxide is mixed with 3 parts of di-2-ethylhexyl-isobutyl acetal. This mixture is worked up with 45 parts of a 50% by weight solution of a copolymer of butyl acrylate, butanediol monoacrylate and vinylidene chloride in a mixture of equal parts of toluene and tetrahydrofuran and with 2 parts of oleic ethanolamide in an agitator mill to form a homogeneous dispersion.

The mixture is stirred for two hours. Then 3.5 parts of 4,4′-diphenylmethane diisocyanate is added and the mixture is stirred for another five minutes. The mixture is filtered and applied to a polyethylene terephthalate film having a thickness of 20 microns, dried at 80° to 100° C., calendered with heated rollers and cut to a width of 1 inch.

The tapes thus prepared are tested in a video recording machine having omega-looping, the head being rotated and the tape stationary. The tapes give a satisfactory image after the test has lasted for 2,500 seconds. In the case of tapes containing comparable amounts of ester wax, stearic acid, graphite or silicone oil as slip additives, a defective image is produced in less than thirty seconds because of abrasion.

EXAMPLE 2

A tape is prepared as described in Example 1 but adding 5 parts of dibutyl-2-ethylhexyl acetal as slip additive instead of the di-2-ethylhexylisobutyl acetal.

An endurance time of more than 4,000 seconds is achieved when the tape is tested under the conditions described in Example 1.

EXAMPLE 3

100 parts of acicular gamma-iron(III) oxide is mixed with 1.5 parts of di-2-ethylhexyl isobutyl acetal. Then 125 parts of a 20% by weight solution of a polyamide from capryllactam and heptadecane dicarboxylic acid and diaminodicyclohexylmethane in a mixture of equal parts of toluene and propanol. 5 parts of stearic acid and 80 parts of a mixture of equal parts of toluene and propanol are added and the mixture is worked up itno a homogeneous dispersion.

The mixture is stirred for two hours, filtered and cast as described in Example 1 onto a film which is cut into tapes.

When the tape is tested under the conditions specified in Example 1, an endurance time of about 2,600 seconds is achieved.

We claim:

1. A magnetic recording medium having high abrasion resistance and comprising a nonmagnetic backing to which has been applied a magnetizable layer consisting of a magnetizable pigment, a polymeric binder for said pigment and a slip aditive wherein the magnetizable layer contains as the slip additive, for each 100 parts by weight of magnetizable pigment, 1.5 to 16 parts by weight of an acetal having the general formula

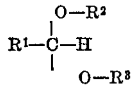

in which $R^1$ denotes a hydrogen atom or an alkyl radical having four to twelve carbon atoms and $R^2$ and $R^3$ denote two identical or different alkyl radicals having four to twelve carbon atoms, the total carbon content of the acetal not exceeding 26 carbon atoms per molecule.

2. A magnetic recording medium as claimed in claim 1 in which the magnetizable layer contains 2.5 to 8 parts by weight of slip additive for each 100 parts by weight of magnetizable pigment.

References Cited

UNITED STATES PATENTS

| | | | |
|---|---|---|---|
| 2,584,657 | 2/1952 | Arcidiacono. | |
| 2,633,431 | 3/1953 | Sylva | 117—161 X |
| 3,149,995 | 9/1964 | Bauer | 117—235 X |
| 3,395,034 | 7/1968 | Przybilla. | |
| 2,734,033 | 2/1956 | Menard | 117—235 X |

OTHER REFERENCES

Levine, IBM Tech. Disclosure, vol. 7, No. 9, February 1965, p. 736.

Friedman et al., IBM Tech. Disclosure, vol. 9, No. 7, December 1966, p. 779.

WILLIAM D. MARTIN, Primary Examiner

B. D. PIANALTO, Assistant Examiner

U.S. Cl. X.R.

117—161, 240; 252—62.54